(12) United States Patent
Exline (10) Patent No.: US 11,285,880 B2
(45) Date of Patent: Mar. 29, 2022

(54) ENERGY ABSORBING SYSTEM AND METHOD FOR VEHICLE

(71) Applicant: Romeo-Rim, Inc., Romeo, MI (US)

(72) Inventor: Matthew Max Exline, Attica, MI (US)

(73) Assignee: Romeo-Rim, Inc., Romeo, MI (US)

( * ) Notice: Subject to any disclaimer, the term of this patent is extended or adjusted under 35 U.S.C. 154(b) by 207 days.

(21) Appl. No.: 16/818,397

(22) Filed: Mar. 13, 2020

(65) Prior Publication Data
US 2020/0215986 A1 Jul. 9, 2020

Related U.S. Application Data

(63) Continuation of application No. 15/894,056, filed on Feb. 12, 2018, now Pat. No. 10,589,687.

(60) Provisional application No. 62/457,363, filed on Feb. 10, 2017.

(51) Int. Cl.
| | |
|---|---|
| *B60R 3/02* | (2006.01) |
| *B60R 19/18* | (2006.01) |
| *B62D 65/02* | (2006.01) |
| *B60R 19/48* | (2006.01) |

(52) U.S. Cl.
CPC .............. *B60R 3/02* (2013.01); *B60R 19/18* (2013.01); *B60R 19/48* (2013.01); *B62D 65/02* (2013.01)

(58) Field of Classification Search
CPC ........... B60R 3/02; B60R 19/18; B60R 19/48; B62D 65/02
See application file for complete search history.

(56) References Cited

U.S. PATENT DOCUMENTS

| | | | | |
|---|---|---|---|---|
| 2009/0308688 | A1* | 12/2009 | Tayar | E06C 1/38 182/89 |
| 2016/0023608 | A1 | 1/2016 | Carr | |
| 2018/0229661 | A1 | 8/2018 | Exline | |

FOREIGN PATENT DOCUMENTS

| | | |
|---|---|---|
| DE | 102012106470 A | 6/2013 |
| GB | 2457541 A | 8/2009 |

OTHER PUBLICATIONS

International Preliminary Report of Patentability from corresponding International Patent Application No. PCT/US2018/017791, dated Aug. 13, 2019, 9 pages.

(Continued)

*Primary Examiner* — D Glenn Dayoan
*Assistant Examiner* — Melissa Ann Bonifazi
(74) *Attorney, Agent, or Firm* — Tucker Ellis LLP; Heather M. Barnes; Michael G. Craig (57) ABSTRACT

One or more techniques and/or systems are disclosed for a device that can be used as a step on a vehicle. A vehicle step device and system can provide a vehicle step in a use disposition, and can retract and automatically return to the use disposition when impacted. Such a device and system can comprise a bracket that is fixed to a vehicle, such as at the bumper, and a step component that is slidably engaged with the bracket. A biasing component can be coupled between the step component and bracket, to apply a biasing force between the two, thereby keeping the step component in a sue position. Upon impact, the step can retract into the bracket, such as into the bumper, and after impact, the biasing component can return the step to the use position.

20 Claims, 10 Drawing Sheets

(56) References Cited

OTHER PUBLICATIONS

International Search Report and The Written Opinion of the International Searching Authority from corresponding International Patent Application No. PCT/US2018/017791, dated Aug. 13, 2019, 14 pages.

* cited by examiner

ENERGY ABSORBING SYSTEM AND METHOD FOR VEHICLE

CROSS-REFERENCE TO RELATED APPLICATIONS

This application is a continuation of U.S. Ser. No. 15/894,056, titled ENERGY ABSORBING SYSTEM AND METHOD FOR VEHICLE, filed Feb. 12, 2018, which claims priority to U.S. Provisional Patent Application Ser. No. 62/457,363, entitled ENERGY ABSORBING SYSTEM AND METHOD FOR VEHICLE, filed Feb. 10, 2017, all of which are incorporated herein by reference.

BACKGROUND

Steps can be used to access a location more easily, by providing stepped elevated platforms for access. Steps can be added to, and have been added to, a variety of locations for a variety of uses. Steps are used in and on vehicles to access entry ways, cargo locations, and even the tops of the vehicles. Vehicle steps are typically found in two varieties, fixed location steps and retractable steps. Further, other components may be engaged with a vehicle, such as at the rear or front of a vehicle, and may be subject to potential impact from other vehicles or objects.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, a vehicle step device and system that provides a vehicle step in a use disposition, for example, at cargo access locations, but can also retract and return to the use disposition upon, or subsequent to, an impact. That is, for example, the step may be disposed in an extended position for normal use at desired access points of the vehicle. Further, in this example, the step may retract away from an impact in order to mitigate damage and automatically return to the use position after the impact. Additionally, in other implementations, one or more portion of these example systems can be utilized on other components engaged with a vehicle, such as a bike rack, luggage holder, or any other components that are attached to the exterior of a vehicle, such as at a bumper (e.g., which are typically designed to absorb impact energy), a vehicle frame or chassis.

In one implementation, a device that can be used as a step on a vehicle can comprise a bracket for installation on, and engagement with, a vehicle. Further, in this implementation, the device can comprise a step component that is disposed in a slidable engagement with the bracket. Here, the step component may be used as a step for access to a portion of the vehicle. Additionally, in this implementation, the device can comprise a biasing component that is fixedly engaged with the step component at a first end and engaged with the bracket at a second end. In this implementation, the biasing component can apply a biasing force to the step component and the bracket. The biasing force can maintain the step component and bracket apart from each other, and the biasing component can allow the step component to retract into the bracket when a force greater than the biasing force is applied to the step component.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices may be shown in block diagram form in order to facilitate describing the claimed subject matter.

A step attached to a vehicle can facilitate easier access to areas of a vehicle that may not be easy to reach, such as at the rear of a vehicle comprising a cargo area. When a step is placed in the rear of the vehicle and it is not retracted behind the bumper of the vehicle, it may be subjected to damage when the vehicle is struck from behind, or the vehicle backs up into another object. Retractable steps are typically stowed behind the bumper when the step is not in use, which is not always convenient to the vehicle user.

A step system can be devised that provides a vehicle step that can be maintained in a use position, but can retract away from potential damage if a force is applied, such as from an impact. As an example, the step system may be fixed (e.g., removably) to the vehicle, such as at the bumper, such as at the rear (e.g., or front) using a bracket, on the chassis, frame, or other suitable locations. Further, in this example, a step component, which may be used as a step, can engage with the bracket such that the step component slides out from the bumper (e.g., or from behind the bumper) in a use position, and retracts into and/or behind the bumper when impacted. Additionally, in this example, a biasing component can be placed between the step and bracket to maintain the step in the use position at least until it is impacted, which can result in the step retracting into and/or behind the bumper to mitigate damage to the step.

Figure 1:
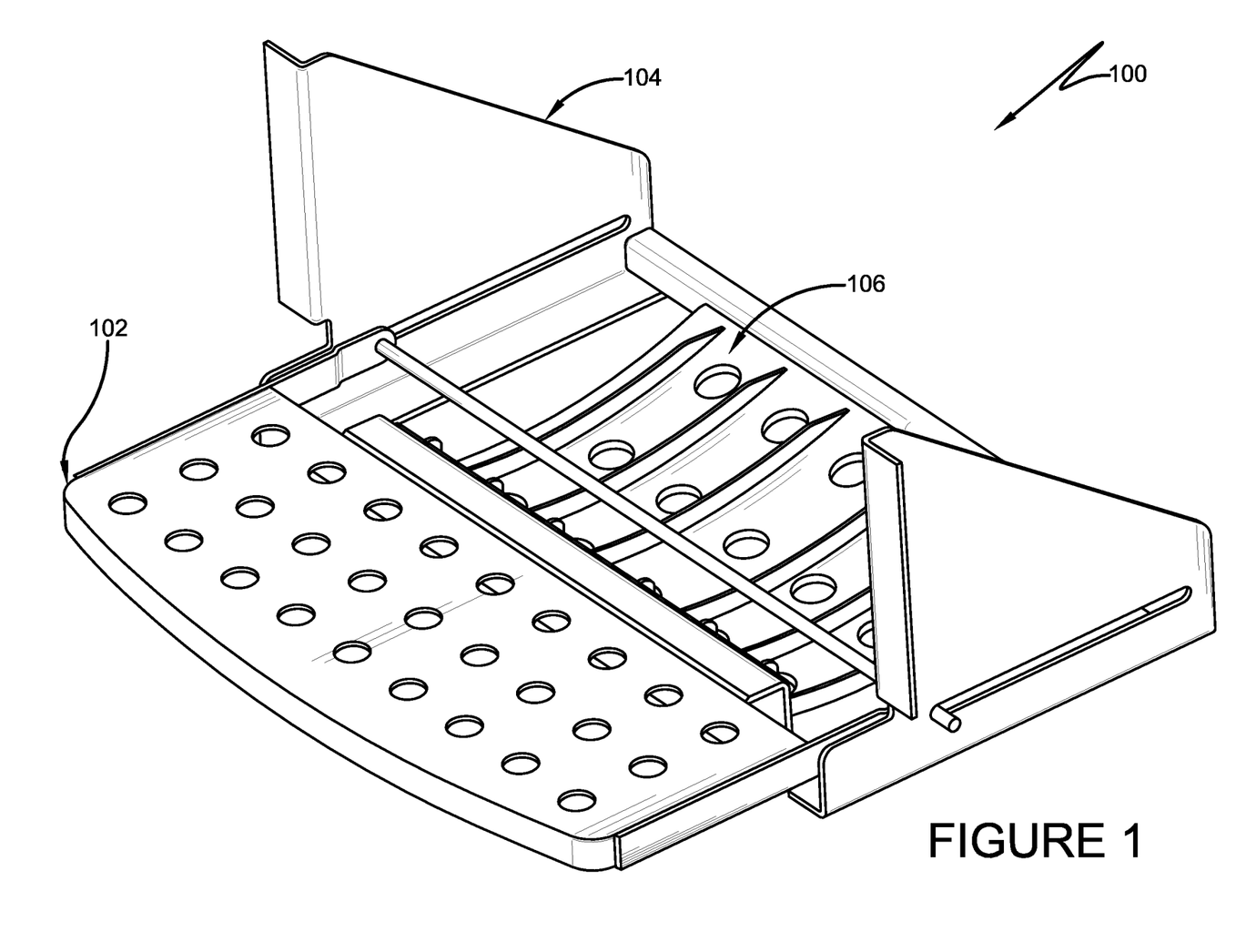
FIG. 1 is a component diagram illustrating an example implementation of an exemplary step system that may be engaged with a vehicle bumper.

FIG. 1 is a component diagram illustrating an example implementation of an exemplary step device 100 that may be engaged with a vehicle bumper (e.g., frame, chassis, or other portions of the vehicle). In this example implementation, the exemplary device 100 comprises a bracket 104 that can be configured for installation on a portion of the vehicle. Further, the exemplary device 100 comprises a step component 102 that is disposed in slidable engagement with the bracket 104, and may be used as a step by a vehicle user, for example. The step component 102 can be configured for use as a step on the vehicle, such as at the rear (e.g., or front) of the vehicle. Additionally, the exemplary device 100 comprises a biasing component 106 that is fixedly engaged with the step component 102 at a first end, and engaged with the bracket 104 at a second end. In one implementation, the biasing component 106 can be configured to apply a biasing force to the step component 102 and the bracket 104, such that the step component and bracket are biased apart from each other, for example, thereby disposing the step in a use position on the vehicle. In this implementation, the biasing component can allow the step component 102 to retract into the bracket (e.g., and into and/or behind the vehicle's bumper) when a force greater than the biasing force is applied to the step component 102.

Figure 2:
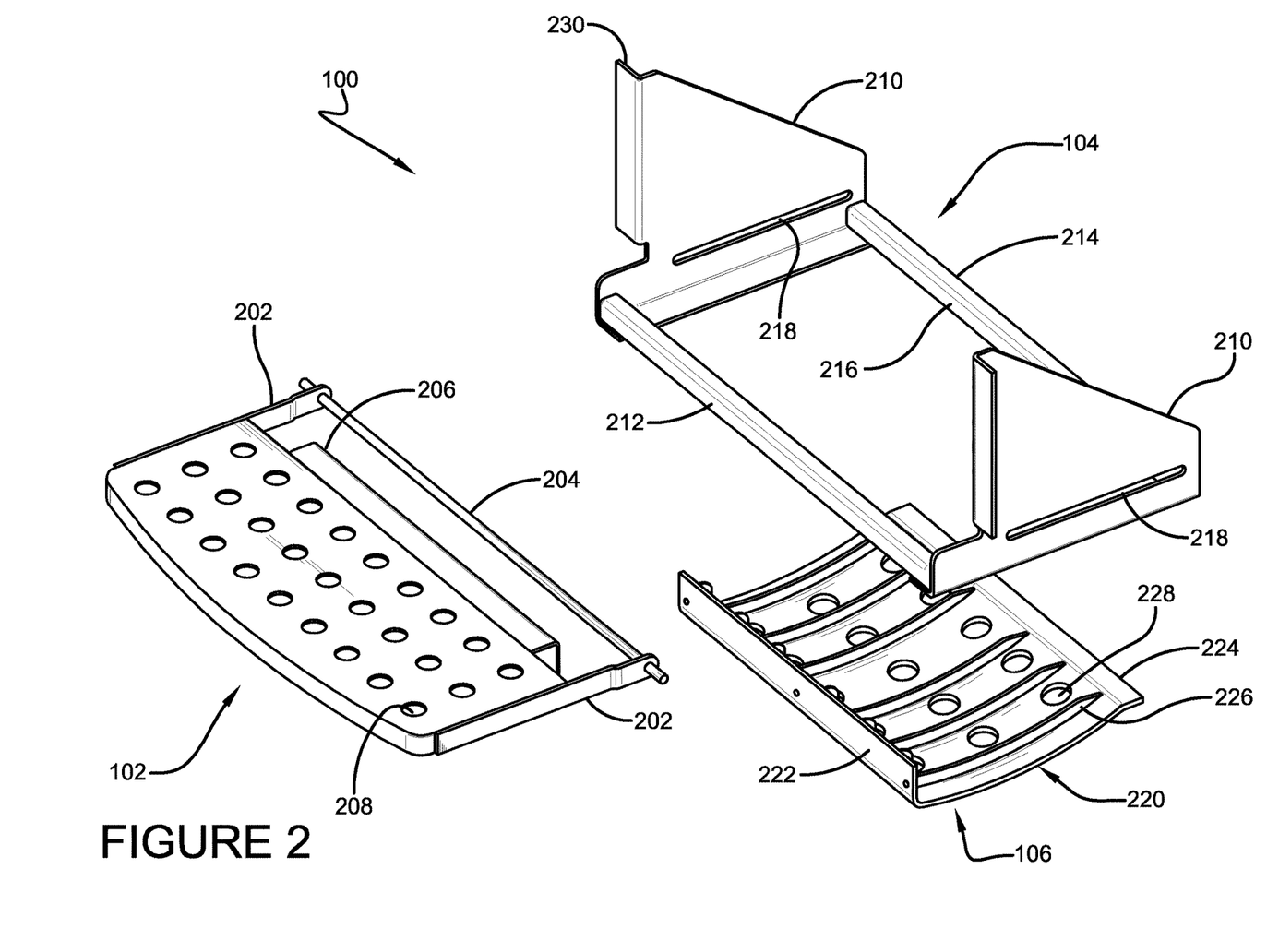
FIG. 2 is a component diagram illustrating an exploded view of an example implementation of one or more portions of one or more components described herein.
Figure 3:
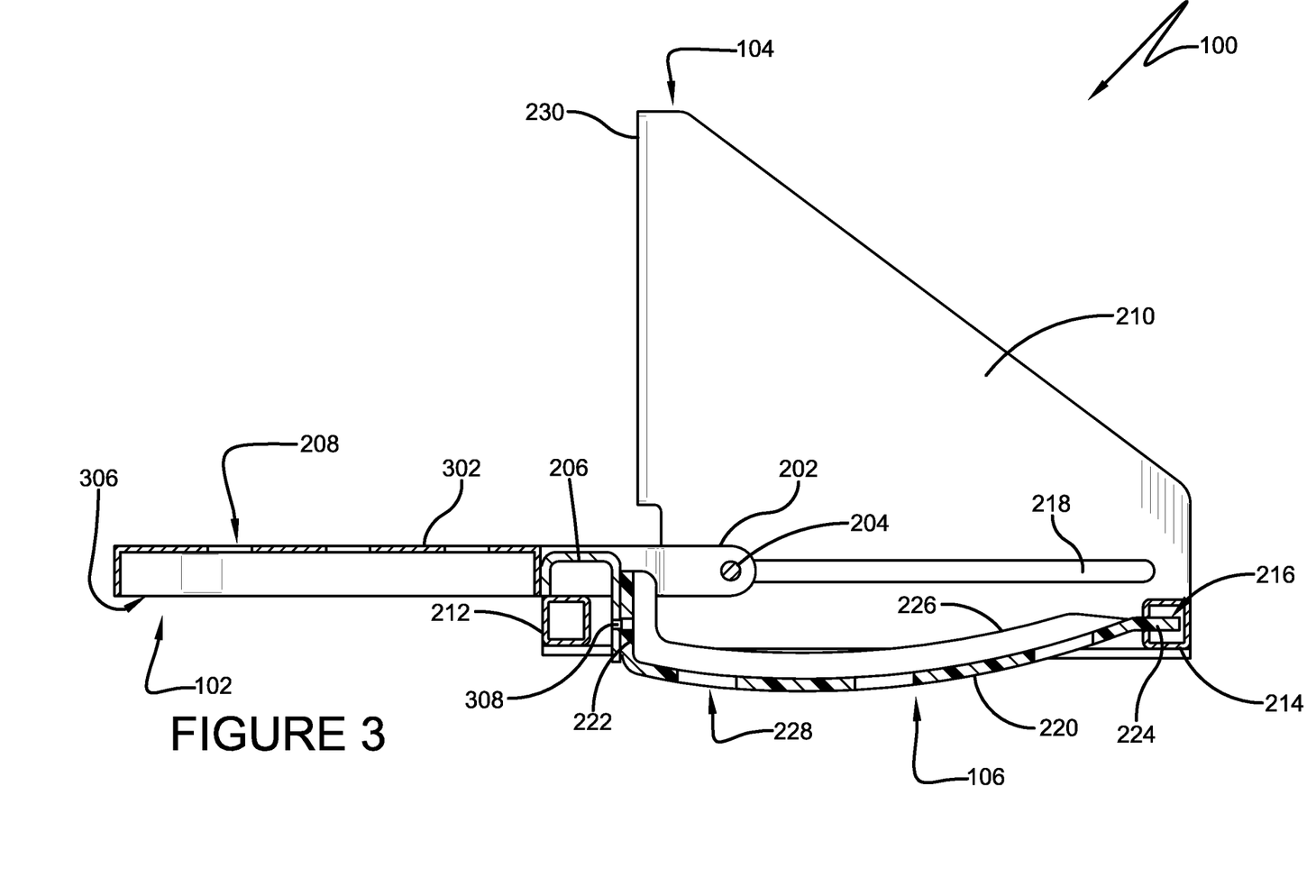
FIG. 3 is a component diagram illustrating an example implementation of one or more portions of one or more components described herein.
Figure 4:
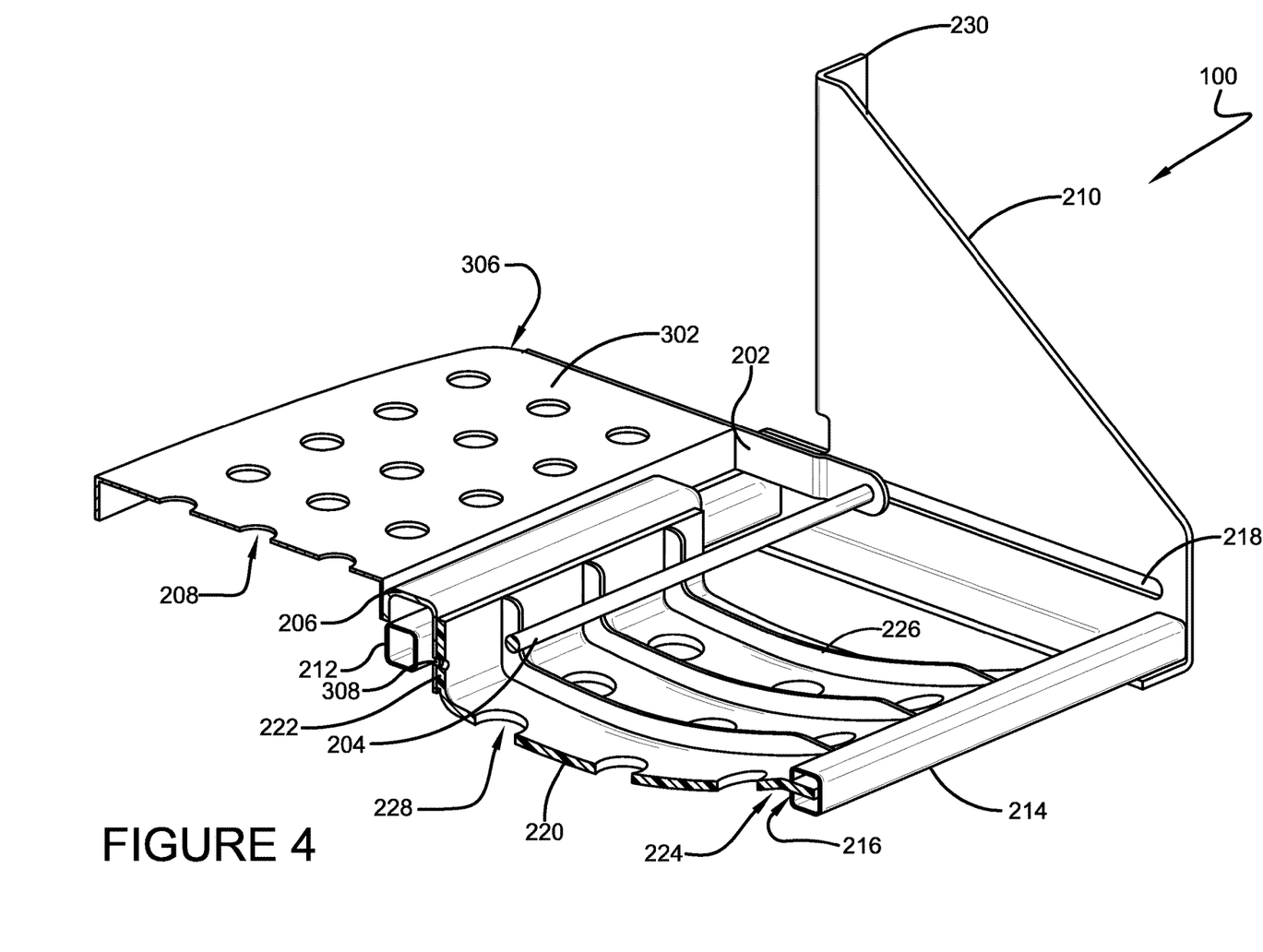
FIG. 4 is a component diagram illustrating an example implementation of one or more portions of one or more components described herein.

FIGS. 2, 3 and 4 are component diagrams illustrating various views of an example implementation of a device that may be used as a step on a vehicle; an exploded view in FIG. 2; a side cut-away view in FIG. 3; and a side-perspective cut-away view in FIG. 4. In one implementation, the step component 102 can comprise one or more step arms 202. In this example, the step component 102 comprises a step arm 202 at respective sides of the step component 102. As an example, the step arm(s) 202 may be fixed to the step component 102 (e.g., welded, soldered, glued, fastened, etc.), or the step arm(s) 202 may be integral with the step component 102 (e.g., formed with the step component, such as cast, molded, or otherwise formed).

In one implementation, the step arm(s) 202 can be configured to engage with a step bracket coupler 204. In this example, the step bracket coupler 204 can comprise a rod-like structure that is disposed in respective cut-outs formed in the step arm(s) 202. In other implementations, for example, the step bracket coupler 204 may comprise a plurality of components, such as extensions fixedly disposed at respective ends of the step arm(s) 202. Regardless of the implementation, the step bracket coupler 204 can be configured to slidably (e.g., and selectably) engage with a corresponding bracket step coupler 218 disposed on the bracket 104. In this way, in this example, the step bracket coupler 204 can translate (e.g., slidably) along the bracket step coupler 218, thereby allowing the step component 102 to slide into and out of the bracket 104 (e.g., and therefore, into and out from behind the attached bumper).

In this example implementation, the step component 102 can comprise a step biaser coupler 206, which can be configured to engage with the biasing component 106. As illustrated in FIG. 3, in one implementation, the step-biaser coupler 206 can be fastened to a biaser-step coupler 222 of the biasing component 106 using a fastener 308 (e.g., a screw, nut and bolt, rivet, etc.). In this implementation, the step component 102 and biasing component 106 are engaged at a rear portion of the step component 102. In other implementations, the biasing component 106 may be engaged with the step component 102 at different locations, such as at a front portion of the step component 102.

As illustrated in FIG. 3, the step component 102 can comprise a step platform 302, which can be configured to act as the horizontal, tread portion of the step. Further, the step component 102 can comprise one or more step vents 208, disposed in the step platform 302. In one implementation, the step vents 208 may be configured to allow liquids and debris to pass through the step platform 302. In one implementation, the step vent(s) 208 can be configured to reduce the weight of the step component 102, by reducing an amount of material used to create the step platform 302. As illustrated in FIGS. 3 and 4, the step component can comprise a step nose 306. As an example, the step nose 306 can be shaped (e.g., curved) to provide for a desired force vector when a force is applied to the step nose 306 area of the step component 102. That is, for example, the shape of the step nose may facilitate in directing the force vector of an impact inward, toward a central portion of the step component 102, thereby allowing appropriate and desired deformation of the biasing component 106, and/or interaction of the step bracket coupler 204 with the bracket step coupler 218.

As an illustrative example, the exemplary device 100 can be configured to retract the step component 102, in a desired manner, regardless of the angle of impact (e.g., and therefore force vector) imparted on the step nose 306 area of the step component 102. That is, the step component 102 may be impacted by an impact face that is substantially parallel to the step nose 306, and can also be impacted at an off-angle by an impact face (e.g., force vector) that is not substantially parallel to the step nose 306. The exemplary device 100 can be configured to retract and return to a substantially pre-impact position under a variety of directions, That is, for example, the direction portion of the impact force vector can comprise a variety of angles to the front face of the step component 102. In one implementation, the direction of the impact force vector can comprise approximately ninety degrees, such as when the impact face and the step component face are substantially parallel. In other implementations, the direction of the impact force vector can comprise a range from ninety degrees to zero degrees; or ninety degrees to one-hundred and eighty degrees. In other implementations, the direction of the impact force vector can comprise a range from zero degrees to one-hundred and eighty degrees; from ten degrees to on-hundred and seventy degrees; from twenty degrees to one-hundred and sixty degrees; from thirty degrees to one-hundred and fifty degrees; from forty degrees to one-hundred and forty degrees; from fifty degrees to one-hundred and thirty degrees; from sixty degrees to one-hundred and twenty degrees; from seventy degrees to one-hundred and ten degrees; and/or from eighty degrees to one-hundred degrees.

As an example, the shape of the step nose 306 area, and the configuration of the biasing component 106, the step bracket coupler 204, and the bracket step coupler 218, may allow for a desired retraction of the step component 102 upon impact; and may allow for a desired return to the use position after the impact. In one implementation, for example, the shape of the step nose 306 area can help direct the force toward the biasing component 106 in a manner that allows the biasing component 106 to receive the force and deform in a desired manner that provides for the retraction and return, from a plurality of angles of impact.

As illustrated in FIGS. 2-4, the bracket component 104 of the exemplary device 100 can comprise one or more bracket vertical supports 210. Further, the bracket component 104 can comprise a bracket front beam 212 and a bracket rear beam 214. In one implementation, as illustrated in FIGS. 3 and 4, when the exemplary device 100 is assembled, the bracket front beam 212 can be disposed in contact with one or more of the step arms 202 of the step component 102. For example, the bracket front beam 212 can provide a support surface for the step component 102 when in use and/or when the step component is slidably retracted into the bracket component 104.

Additionally, the bracket rear beam 214 can comprise a bracket biaser coupler 216. In one implementation, the bracket biaser coupler 216 may comprise a slot disposed in the bracket rear beam 214 that is configured to receive (e.g., and maintain in place during use) a portion of the biasing component 106. For example, the biasing component 106 can comprise a biaser bracket coupler 224 that is configured to engage with the bracket biaser coupler 216. In this example, the biaser bracket coupler 224 can comprise an elongated portion that is sized to couple with the bracket biaser coupler 216 slot. In other implementation, a variety of coupling methods and devices may be used, such as fasteners, or friction fit components, or even fixed engagement using soldering, welding, gluing, etc.

In one implementation, the bracket component 104 can comprise one or more bracket vehicle couplers 230. In this implementation, a bracket vehicle coupler 230 can be configured to engage with a portion of a vehicle, such as at the bumper (e.g., or some other portion of the vehicle), for example, thereby disposing an assembled exemplary device 100 on the vehicle's bumper in a use position. In some implementations, the bracket vehicle coupler 230 can be disposed on the respective one or more bracket vertical supports 210, as illustrated in FIGS. 2-4. As an example, the bracket vehicle coupler 230 can be formed as a portion of the bracket vertical support 210, or the bracket vehicle coupler 230 can be fixed to the bracket vertical support 210 as a separate component. In other implementations, the bracket vehicle coupler 230 can be disposed on other parts of the bracket component, and be configured to fasten the bracket component 210 to the vehicle, such as at the bumper (e.g., frame, chassis, or another portion of the vehicle).

Further, the step component 102, step arms 202, bracket component 104, step bracket coupler 204, step biaser coupler 206, bracket vertical support 210, bracket front beam 212, bracket rear beam 214, bracket biaser coupler 216, bracket step coupler 218, step platform 302, step nose 306, step biaser fastener, and/or other component can be comprised of a material that is suitable for the intended use. Such materials can include, but are not limited to, metal-based products, polymer-based products, carbon or graphite based products, and/or combination of these. Such components can be formed, layered, molded, cast, machined, punched, pressed, or otherwise manufactured according to intended use and/or conditions of use.

As illustrated in the FIGS. 2-4, the biasing component 106 of the exemplary device 100 can comprise a biaser panel 220. A biasing component 106 can comprise some type of spring that provides a biasing force between two objects, in this case, as an example, between the bracket component 104 and the step component 102. Further, for example, a biasing force can be provided by a variety of components, including spring-shaped devices (e.g., coils, clips, etc.), compressed substances with shape memory, and anything appropriately engineered to maintain two objects apart and return to an original shape when compressed or elongated. In this implementation 100, the biasing component comprises the biaser panel 220, which can be configured to provide the biasing force between the bracket component 104 and the step component 102, and return to a substantially original shape (e.g., as pictured in FIGS. 2-4) after being compressed (e.g., when the step component 102 is force into the bracket component 104). In one implementation, the biaser panel 220 can be comprised of a suitable polymer substance. In other implementations, the biaser panel 220 can be comprised of any suitable substance that provides the sufficient biasing force and also can return to a substantially original shape after compression (e.g., thereby returning to providing a similar amount of biasing force after compression), such as metal-based products, and/or carbon-based products that have a shape memory.

As illustrated in FIGS. 2-4, in one implementation, the biasing component 106 can comprise one or more biaser panel ribs 226. A biaser panel rib 226 can be configured to provide additional rigidity to the biasing component, for example, thereby providing additional biasing force, and/or reinforcing the biaser panel 220. As an example, a number, size, location, and/or shape of respective biaser panel ribs 226 used on a biaser panel 220 may vary depending on the intended use of the exemplary device 100. That is, for example, the amount and vector rates of an applied force expected to be encountered by the exemplary step component may, at least in part, determine the amount of additional rigidity, and/or biasing force, desired to account for the applied force. As an example, a step component used on a larger vehicle may encounter greater force vectors (e.g., due to increased momentum) than a much lighter vehicle.

In one implementation, the biaser component 106 can comprise a biaser step coupler 222, and a biaser bracket coupler 224. The biaser bracket coupler 224 can be configured to couple with, at least a portion of, the bracket component 104, as described above. The biaser step coupler 222 can be configured to engage with the step component 102, such as at the step biaser coupler 204. In one implementation, as illustrated in FIGS. 3 and 4, a step biaser fastener 308 can be used to fixedly couple the step component 102 with the biaser component 106. In one implementation, the step biaser fastener 308 may be configured to be selectably removed, for example, such that the biasing component 106 can be selectably de-coupled from the step component 102 (e.g., for repair and/or replacement). As illustrated, the biasing component 102 is fixed to the step component 102 at a rear portion of the step component. In other implementations, the step biaser coupler 206 may be disposed at other locations on the step component 102, such as at a mid-portion, or at a front portion of the step component 102.

In one implementation, the biasing panel 220 can comprise one or more biaser vents 228. The biaser vent 228 can be configured to provide a drain point for liquids and/or debris that may have collected on one side (e.g., top) of the biaser panel 220. Further, the biaser vent 228 can be configured to provide for weight reduction and/or weight management of the biasing component 106. That is, it is often desirable to reduce weight on vehicles in order to increase fuel use efficiency. Additionally, the biaser vent 228 can be configured to provide for a desired biasing force, and/or a deformation characteristic, for the biaser panel 220. That is, for example, a number, size, shape, and/or location of the one or more biaser vents 228 may alter the biasing force provided by the biasing component 102. The number, size, shape, and/or location of the one or more biaser vents 228 may also alter a deformation characteristic of the biaser panel, such as during compression or when the biaser panel 220 returns to its original shape after compression.

In one implementation, the biaser panel 220 can be configured to distribute deformation forces across the panel, for example, to distribute the deformation in a substantially uniform manner. As an example, the panel design, shape, constituent material, ribbing, and/or vent can be configured to allow substantially uniform distribution of the impact force across the panel. In this way, in this example, the biaser panel 220 may be able to deform in a substantially uniform manner. Uniform deformation of the biaser panel 220 can allow for substantially uniform retraction of the step component 102 along the bracket step coupler 218. For example, a different biasing component that is subjected to an impact force may result in uneven retraction of the step component into the bracket, thereby resulting in a jam, such that the step component is not able to return to the non-impact position. Further, the uneven retraction could cause damage to the bracket, and/or step component.

In one implementation, the exemplary device 100 can be configured to mitigate damage to the step component 102 (e.g., and allow it to return to the in-use position after impact) for impacts that occur at five miles per hour (5 mph) or less. In other implementations, the exemplary device 100 can be configured to mitigate damage to the step component 102 (e.g., and allow it to return to the in-use position after impact) for impacts that occur at greater than 5 mph.

Figure 5:
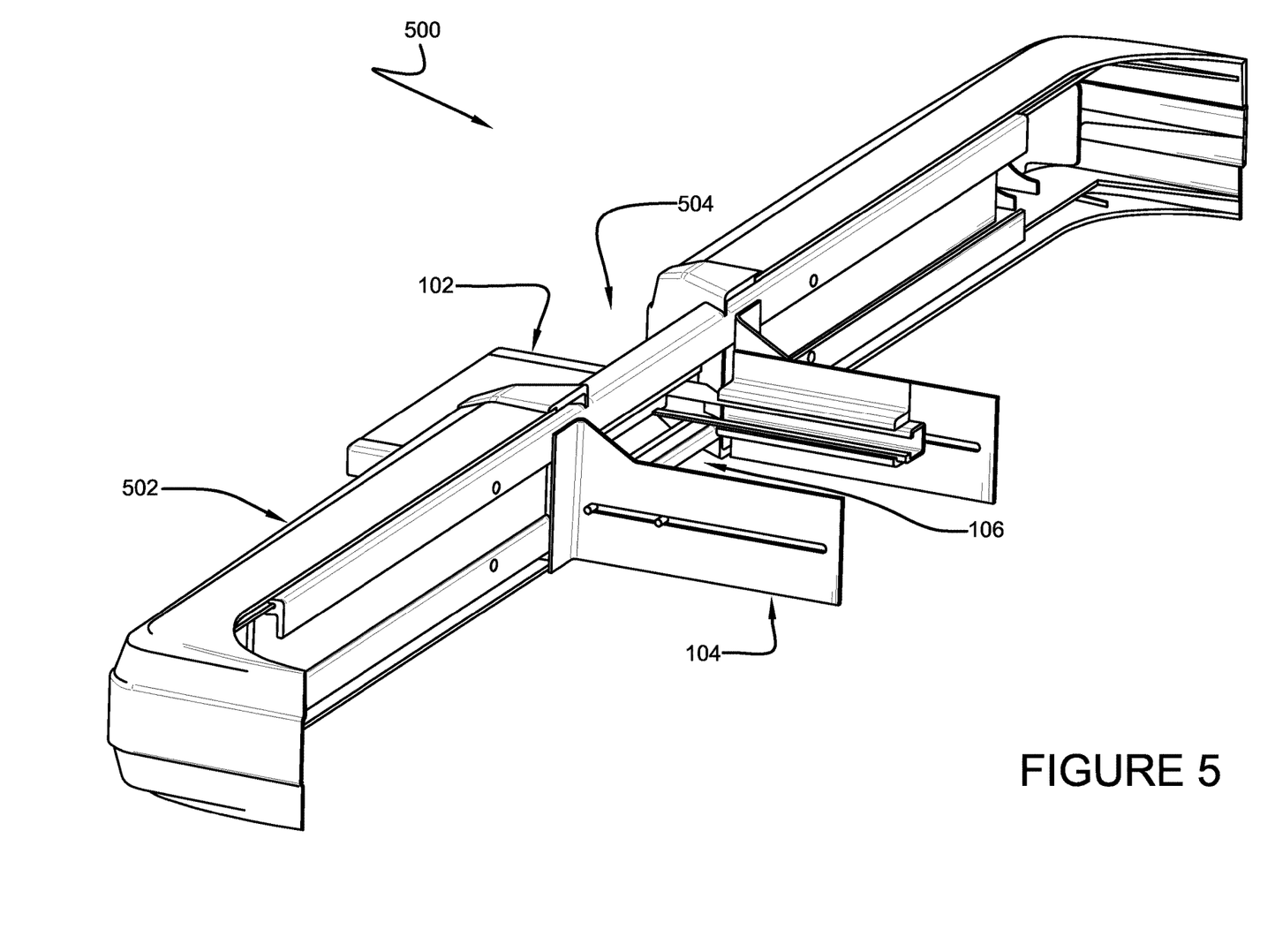
FIG. 5 is a component diagram illustrating an example implementation of one or more portions of one or more components described herein.
Figure 6:
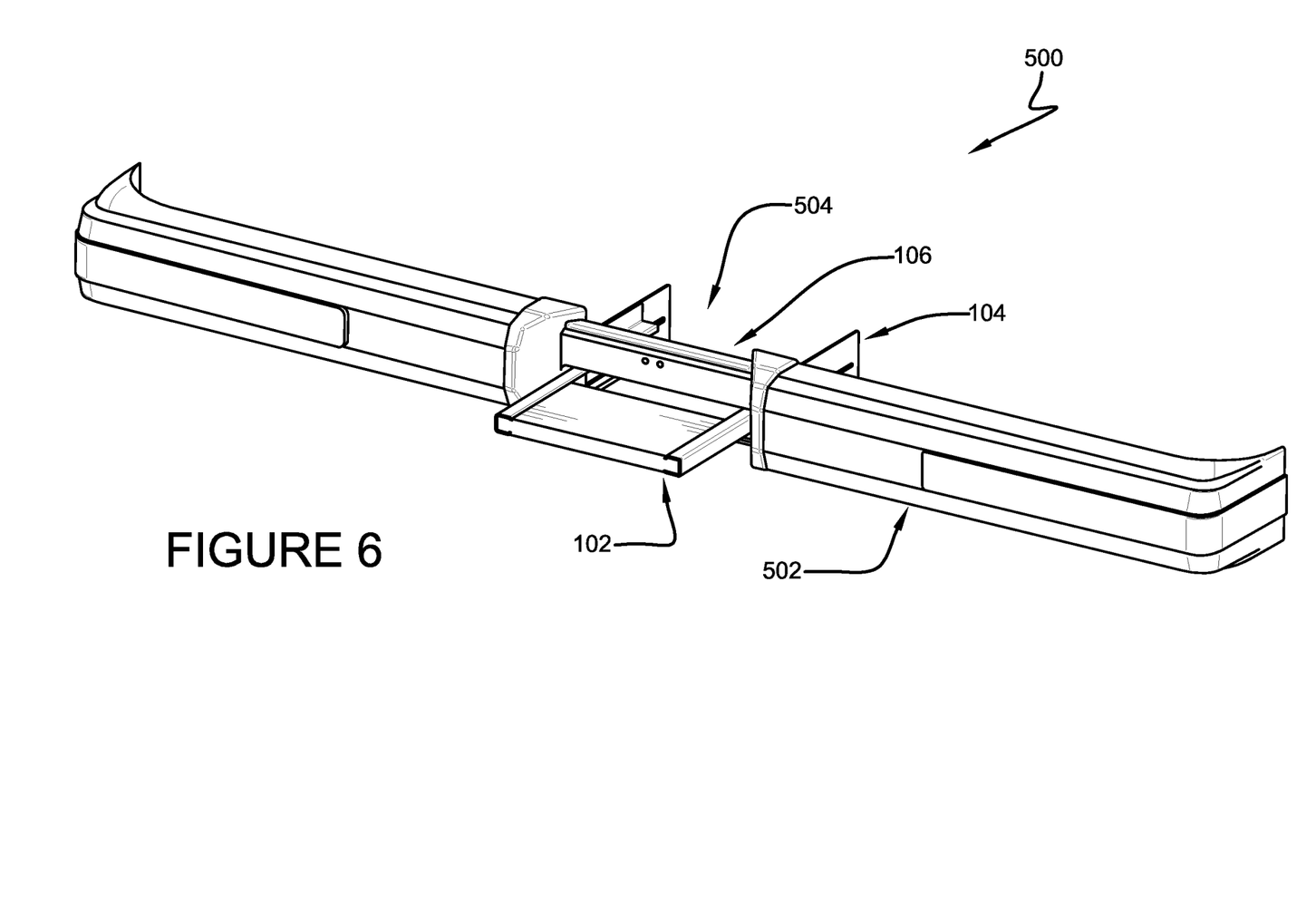
FIG. 6 is a component diagram illustrating an example implementation of one or more portions of one or more components described herein.

FIGS. 5 and 6 are component diagram illustrating an example implementation of a system 500 for providing a step on a vehicle. In this example system 500, a vehicle bumper 502 comprises a step installation location 504. It should be noted that, while this implementation describes a system that utilizes a bumper, the exemplary device can be installed on the vehicle at other locations, such as the frame, chassis, or other desired locations. Further, the exemplary device may be installed at a location designed for such installation, or retrofitted to an existing location (e.g., bumper). As an example, for a rear bumper of a vehicle, the step installation location 504 can comprise a central area, such as when a cargo cabin access may be provided on the rear of the vehicle; however, a step installation location 504 can also be provided at either end (e.g., in between), depending on the intended use of the target vehicle.

Further, in this implementation, the bracket component 104 can be fixedly engaged with the vehicle bumper 502, at the step installation location 504. The step component 102 can be slidably engaged with the bracket component 104, for example, as described above. In one implementation, the biasing component 106 can be engaged with both the step component 102 and the bracket component 104, such that the step component 102 is disposed in and extended position (e.g., as illustrated, the step remains extended in the use position), as a default position (e.g., biased apart from the bracket component 104).

Figure 7:
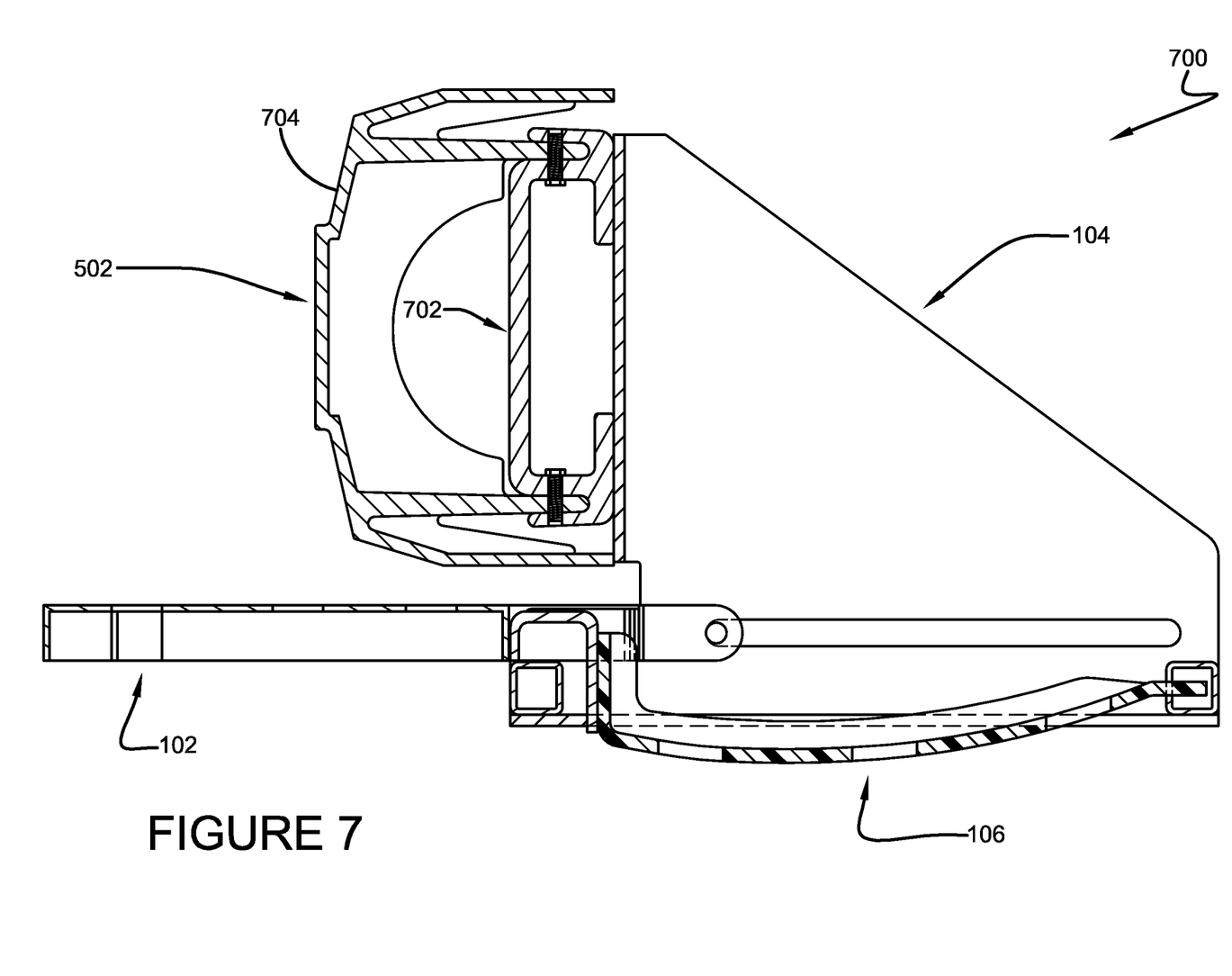
FIG. 7 is a component diagram illustrating an example implementation of one or more portions of one or more components described herein.
Figure 8:
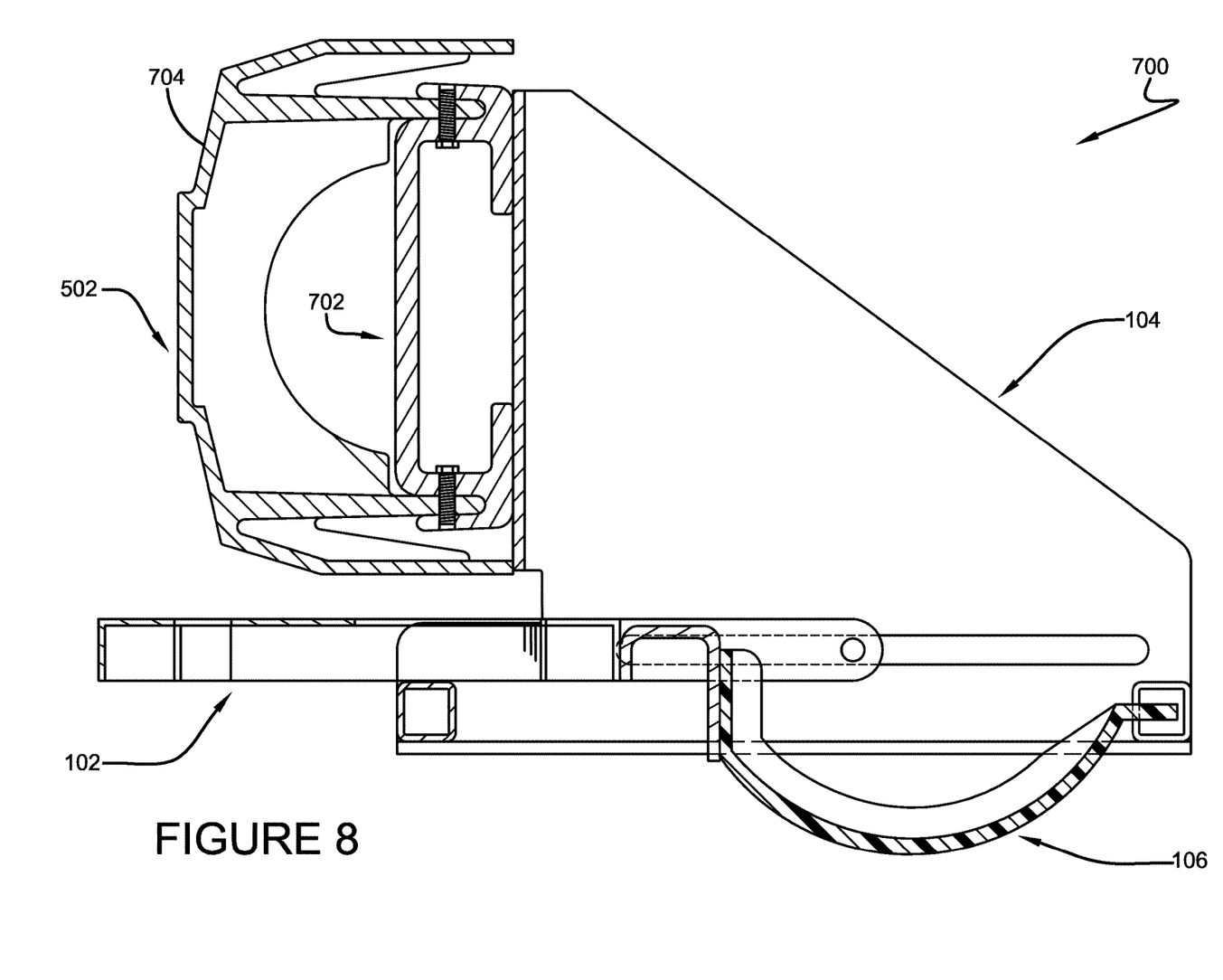
FIG. 8 is a component diagram illustrating an example implementation of one or more portions of one or more components described herein.
Figure 9:
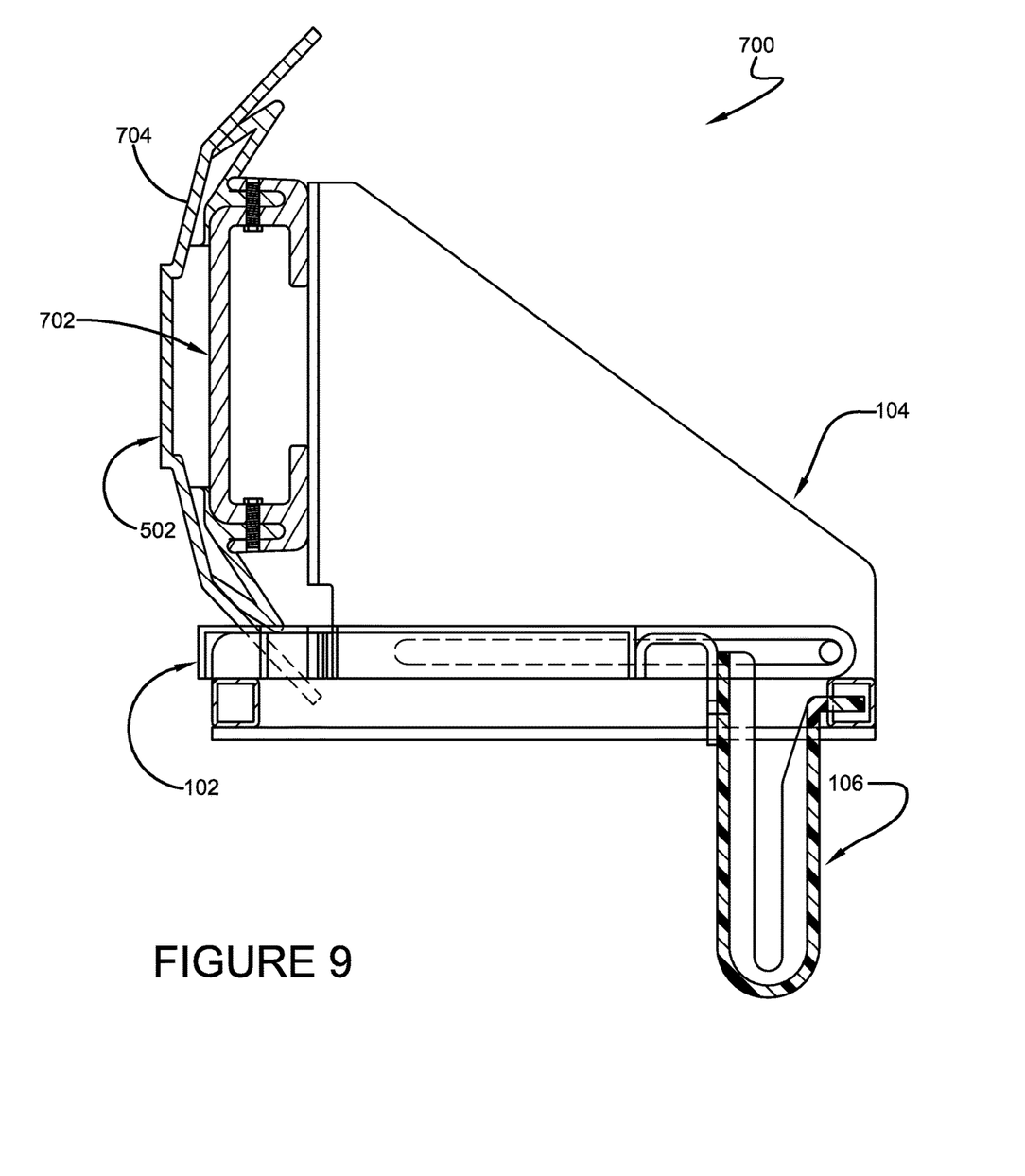
FIG. 9 is a component diagram illustrating an example implementation of one or more portions of one or more components described herein.

As an illustrative example, as illustrated in FIGS. 7, 8 and 9, an example step component and bumper system 700 may be subjected to an external force that results in the step component 102 being translated back into the bracket component (e.g., and therefore into, and/or behind the front or face of, the bumper 502). In this illustrative example, the example step component and bumper system 700 is mounted below the bumper 502. However, it is anticipated that the example step component system 700 can be mounted above the bumper 502, through the bumper 502, and at other locations, such as on the frame or chassis. As illustrated in FIGS. 7-9, the bumper 502 can comprise a bumper beam 702 (e.g., comprising ridged material, such as metal), and a bumper outer shell 704 (e.g., comprising flexible materials, such as a polymer-based material). In this example implementation, the bracket component 104 can be coupled to the bumper beam 702 in a typical use disposition.

As an illustrative example, a vehicle comprising the example step component and bumper system 700 may be reversing into a loading dock and may inadvertently strike the step component 102 against the loading dock (e.g., or another vehicle may strike the target vehicle in the rear). Using this example, as illustrated in FIG. 7, the step component 102 and biasing component 106 are disposed in a static condition prior to impact, where the step component 102 is maintained apart from the bracket component 104. As illustrated in FIG. 8, during impact, for example, the step component slidably translates into (e.g., forward if the rear bumper is being impacted) the bracket component 104; and the biasing component 106 begins to deform, as the impact force is sufficient to overcome the biasing force of the biasing component 106.

As illustrated in FIG. 9, during impact (e.g., near an end of an impact event), the step component 102 has translated further into the bracket 104 and behind the front or face of the bumper 502, and the biasing component 106 has further deformed as a result of the applied impact force, along with the bumper outer shell 704. In this implementation, the step component 120 has translated sufficiently into the bracket component 104 that additional impact force may be distributed to the bumper 504 (e.g., and bumper beam 702), thereby mitigating damage to the step component 102. In one implementation, the exemplary system 700 can be disposed on an energy absorbing vehicle bumper, such as the Romeo Rim HELP bumper, or other energy absorbing bumpers. In this way, in this implementation, the exemplary system described herein may aid in mitigating and/or managing the impact forces in combination with an energy absorbing bumper. Further, the exemplary system 700, alone or in combination with an energy absorbing bumper, may be able to mitigate damage to the object impacting the exemplary system 700, for example, by absorbing and distributing some of the impact forces away from the object.

As an example, after the impact force has been reduced or removed (e.g., the vehicle moves away from the impacting object), the biasing component 106 may apply the biasing force between the bracket component 104 and the step component 102. In this example, this biasing force may result in the step component 102 being translated back out of the bracket component 104 and back to the original position (e.g., illustrated by going backward through the FIGURES from 9, to 8, to 7). In this way, for example, damage to the step component 102 can be mitigated, as the step component 102 may retract into the bumper during impact, and may return to use position after impact. In one implementation, the step component 102 may be able to withstand multiple impacts, with little or no damage to the step component and assembly (e.g., bracket 104, biasing component 106, etc.); and may continue to return to its original, in-use position after multiple impacts.

Figure 10:
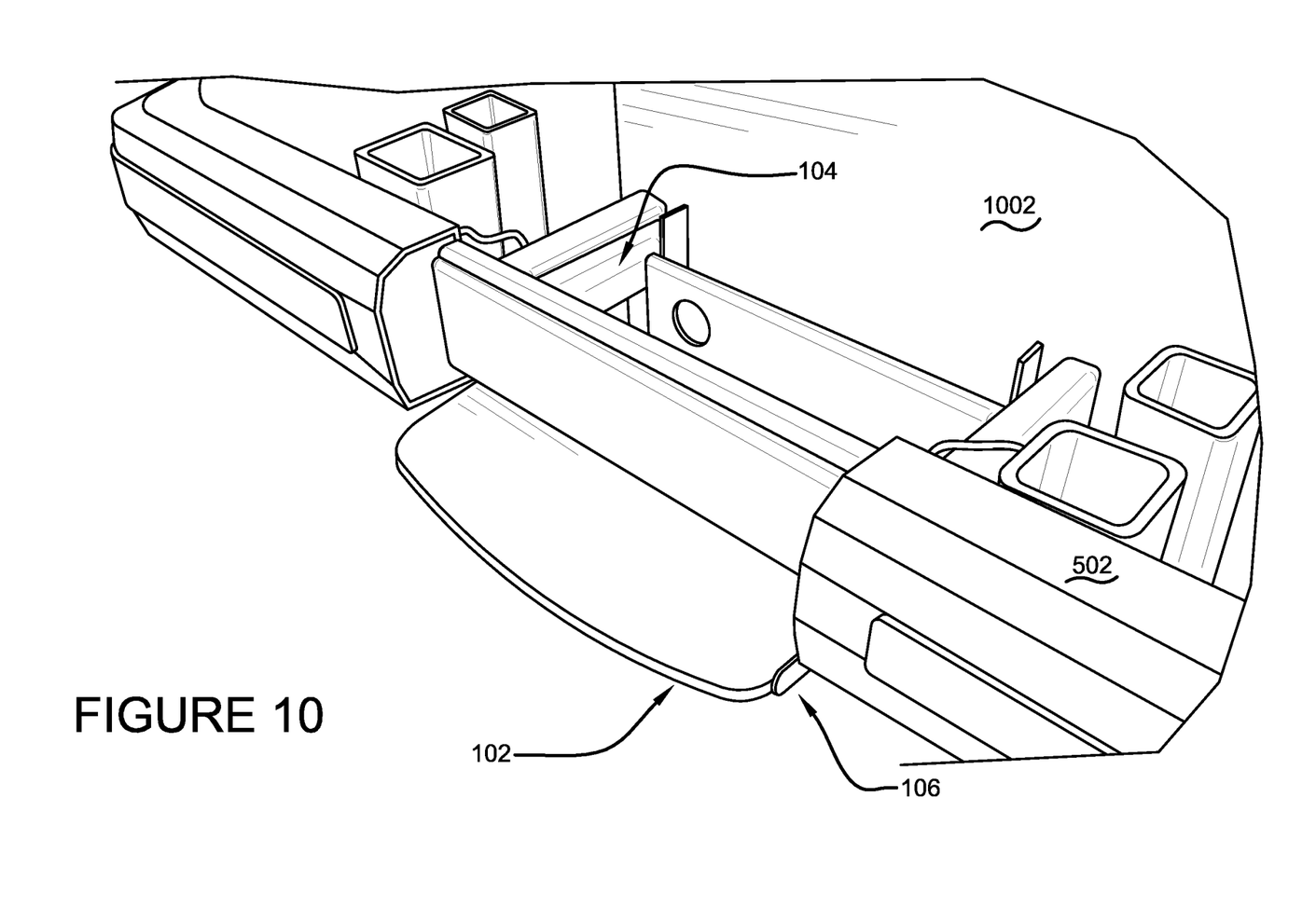
FIG. 10 is a diagram illustrating an example implementation of one or more portions of one or more components described herein.

As another illustrative example, FIG. 10 is a component diagram illustrating an example environment where one or more component described herein may be implemented. In this example, the step component 102 can be slidably coupled with the bracket component 104. Further, the biasing component 106 can be operably coupled with both the step component 102 and the bracket component 104. Additionally, the bracket component 104 can be fixedly engaged with a vehicle bumper 502. In one implementation, as illustrated, the bumper 502 can comprise a cut-out portion that is configured and sized to accommodate the step component 102, such that the step platform is readily accessible in the use position. In this example, the bumper 502 can be fixedly engaged with the target vehicle 1002, and, for example, the exemplary system may be used as a vehicle step, such as to more readily access an interior cargo compartment. Further, as an example, the exemplary device may be retrofitted to an existing bumper, frame or vehicle chassis, or can be fitted with the exemplary system during manufacture of the vehicle.

In another aspect, one or more portions of the techniques and systems described herein may be used for alternate implementations. In one implementation, in this aspect, the bracket and biasing component systems may be engaged with a different component (e.g., instead of the step component), such as a carrier component (e.g., luggage holder, bike rack, ski rack, etc.), or any other component that may be subjected to impact from an object or other vehicle. In this aspect, the energy absorbing nature of the exemplary systems described herein, in combination with an energy absorbing bumper, for example, may mitigate damage to these components and/or the vehicle itself.

As an example, the bracket component can be engaged with the vehicle, such as at the bumper, and the biasing component can be engaged with the bracket and strut or support component that is engaged with a desired attachment. For example, a luggage rack, bike rack or other attachment can be engaged to the strut component. In this way, in this example, if the attached component is subjected to an impact force, the biasing component may absorb the force (e.g., as described above), and return the component to the non-impact position after the force is removed (e.g., after impact).

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Reference throughout this specification to "one implementation" or "an implementation" means that a particular feature, structure, or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

What is claimed is:

1. A vehicle bumper system, comprising:
  a vehicle bumper to install on a vehicle;
  a bracket component fixedly installed on a portion of the vehicle bumper;
  a step component for use as a step on the vehicle, the step component in slidable engagement with the bracket component between a use position and a retracted positon;
  a biasing component fixedly engaged at a first end with the step component and engaged at a second end with the bracket component, the biasing component comprising a biaser panel disposed substantially horizontally between the step component and the bracket component, the biasing component applying a biasing force to the step component and the bracket component, wherein the biasing force maintains the step component apart from the bracket component in the use position, allows the step component to retract into the bracket component in the retracted position when a force greater than the biasing force is applied to the step component, and allows the step component to substantially return to the use position when the force is removed.

2. The vehicle bumper system of claim 1, wherein the step component protrudes from a face of the vehicle bumper in the use position, and the step component retracts behind the face of the vehicle bumper in the retracted position.

3. The vehicle bumper system of claim 1, wherein the biaser panel deforms under the force greater than the biasing force, allowing the step component to retract into the bracket component in the retracted position.

4. The vehicle bumper system of claim 1, wherein the biaser panel substantially returns to a pre-impact shape when the force is removed, allowing the step component to substantially return to the use position.

5. The vehicle bumper system of claim 1, wherein the biaser panel comprises one or more biaser vents, the biaser vents configured to allow substantially uniform deformation of the biaser panel.

6. The vehicle bumper system of claim 1, wherein the biaser component further comprises one or more biaser panel ribs disposed substantially parallel to a direction of the biasing force, the biaser panel ribs providing additional biasing force.

7. The vehicle bumper system of claim 1, wherein the step component further comprises a step platform comprising one or more step vents.

8. The vehicle bumper system of claim 1, where step component further comprises a step nose, the step nose comprising a curved shape that allows impact forces to be directed towards a central portion of the step component.

9. The vehicle bumper system of claim 1, wherein the step component comprises a step-bracket coupler comprising one or more step arms, the step-bracket component in slidable engagement with the bracket component.

10. The vehicle bumper system of claim 1, wherein the bracket component comprises a bracket-step coupler comprising a slot, the bracket-step coupler providing the slidable engagement with the step-bracket coupler.

11. The vehicle bumper system of claim 1, wherein the bracket component further comprises:
a vertical support;
a front horizontal support beam;
a rear horizontal support beam; and
one or more bracket-vehicle couplers.

12. The vehicle bumper system of claim 11:
the vertical support comprising the one or more bracket-vehicle couplers; and
the rear horizontal support beam comprising a bracket-biaser coupler coupled with the biasing component.

13. A device that can be used as a step on a vehicle, comprising:
a bracket component to fixedly install on the vehicle, the bracket component comprising:
a vertical support;
one or more bracket-vehicle couplers;
a bracket-step coupler comprising a slot; and
a bracket-biaser coupler;
a step component in slidable engagement with the bracket component between a use position and a retracted positon, the step component comprising:
a step platform;
a step-bracket coupler comprising one or more step arms, the step-bracket coupler in slidable engagement with the bracket-step coupler;
a step-biaser coupler; and
a step nose comprising a curved shape, the step nose configured to direct impact forces towards a central portion of the step component; and
a biasing component applying a biasing force to the step component and the bracket component, the biasing component comprises:
a biaser-step coupler engaged with the step-biaser coupler; and
a biaser-bracket coupler selectably engaged with the bracket-biaser coupler,
wherein the biasing component maintains the step component apart from the bracket component in the use position, and allows the step component to retract into the bracket component in the retracted position under an impact force greater than the biasing force, mitigating damage to the step component from impact forces.

14. The device of claim 13, wherein the bracket component further comprises:
a front support beam; and
a rear support beam, the rear support beam comprising the bracket-biaser coupler.

15. The device of claim 13, wherein the biaser component further comprises one or more biaser panel ribs disposed substantially parallel to a direction of the biasing force.

16. The device of claim 13, the biasing component further comprising a biaser panel comprising one or more biaser vents, wherein the biaser panel deforms under the impact force to allow the step component to retract into the bracket component, and wherein the biaser panel substantially returns to a non-deformed shape when the impact force is removed, allowing the step component to substantially return to the use position.

17. The device of claim 13, wherein the device is engaged with one of:
a vehicle bumper;
a frame of the vehicle; and
a chassis of the vehicle.

18. A method for mitigating damage on a step device installed on a vehicle, comprising:
fixedly engaging a bracket component to a vehicle bumper for installation on the vehicle;
coupling a rear portion of a biasing component to the bracket component, wherein the biasing component foldably deforms under a force greater than a biasing force;
coupling a front portion of the biasing component with a rear portion of a step component; and
slidably engaging the step component with the bracket component, such that the step component can slide in the bracket component between a use position and a retracted position, wherein the step component can retract into the bracket component in the retracted position when the force greater than the biasing force is applied to the step component.

19. The method of claim 18, wherein the slidably engaging the step component with the bracket component comprises placing rod-like extensions fixed to the step component into slots disposed in the bracket component.

20. The method of claim 18, wherein:
the coupling the rear portion of the biasing component to the bracket component comprises coupling the biasing component with a rear horizontal beam portion of the bracket component; and
wherein the coupling the front portion of the biasing component with the rear portion of the step component comprises fastening the biasing component to a rear support of the step component.

\* \* \* \* \*